US 6,481,551 B1

(12) United States Patent  
Ruth

(10) Patent No.: US 6,481,551 B1
(45) Date of Patent: Nov. 19, 2002

(54) INERTIA-ACTUATED OVERRUNNING COUPLING ASSEMBLY

(75) Inventor: Stephen M. Ruth, Holly, MI (US)

(73) Assignee: Means Industries, Inc., Saginaw, MI (US)

( * ) Notice: Subject to any disclaimer, the term of this patent is extended or adjusted under 35 U.S.C. 154(b) by 0 days.

(21) Appl. No.: 09/723,531

(22) Filed: Nov. 27, 2000

(51) Int. Cl.[7] .............................. F16D 41/12; F16H 3/44
(52) U.S. Cl. .................... 192/46; 192/69.1; 192/103 C; 475/292; 475/312
(58) Field of Search ..................... 192/46, 69.1, 103 C, 192/105 B, 45.1; 475/312, 292

(56) References Cited

U.S. PATENT DOCUMENTS

| | | |
|---|---|---|
| 5,070,978 A | 12/1991 | Pires |
| 5,234,390 A * | 8/1993 | Malecha ..................... 192/45.1 |
| 5,413,539 A | 5/1995 | Leonard et al. |
| 5,437,584 A | 8/1995 | Garrett et al. |
| 5,597,057 A | 1/1997 | Ruth et al. |
| 5,690,202 A | 11/1997 | Myers |
| 5,700,218 A * | 12/1997 | VanSelous et al. ........... 475/12 |
| 5,829,565 A | 11/1998 | Fergle et al. |
| 5,852,932 A | 12/1998 | Matsumoto |
| 5,855,263 A | 1/1999 | Fergle |
| 5,871,071 A | 2/1999 | Sink |
| 5,918,715 A | 7/1999 | Ruth et al. |
| 5,964,331 A * | 10/1999 | Reed et al. ..................... 192/46 |
| 5,979,627 A | 11/1999 | Ruth et al. |
| 6,332,520 B1 * | 12/2001 | Costin .......................... 192/46 |

\* cited by examiner

Primary Examiner—Rodney H Bonck

(57) ABSTRACT

A planar inertia-actuated overrunning coupling assembly having a pocket plate and a notch plate mounted on a common rotary axis with planar juxtaposed coupling surfaces. A pocket plate having a plurality of angularly spaced pockets that receive adjustable clutch elements, the notch plate having angularly spaced notches, a clutch element being mounted in each pocket for pivotal movement about one edge thereof, an inertia-actuated ball in each pocket adjacent a clutch element, the pocket being formed with a ramp surface engageable with the inertiaactuated ball whereby the clutch element is shifted into locking engagement with the pocket plate in response to an inertia force acting on the actuator balls whereby torque is transmitted from one plate to the other in one direction of relative rotation of the plates, and wherein the clutch elements move out of registry with the pocket plate upon a reversal in the direction of relative rotation of the plates.

20 Claims, 5 Drawing Sheets

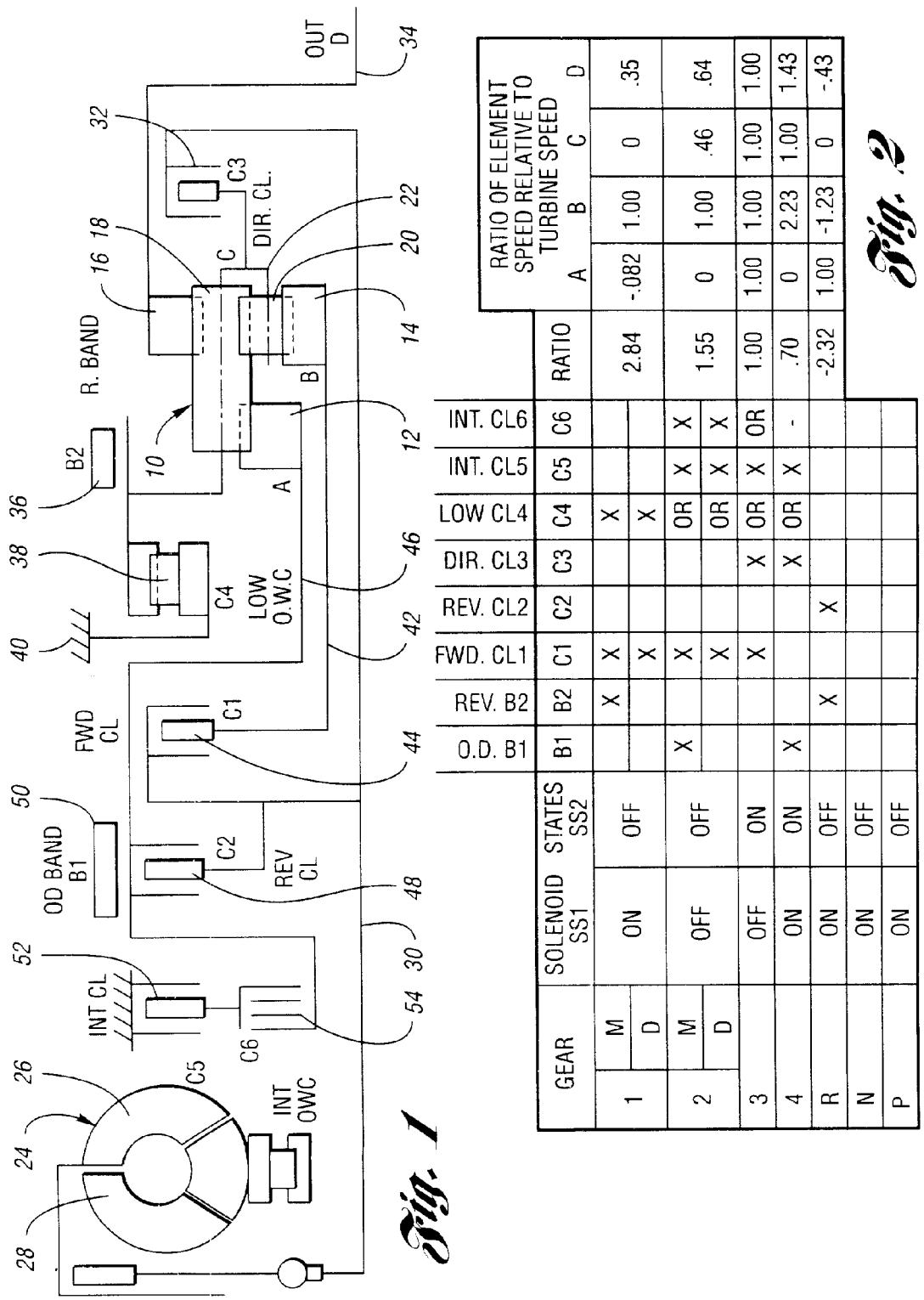

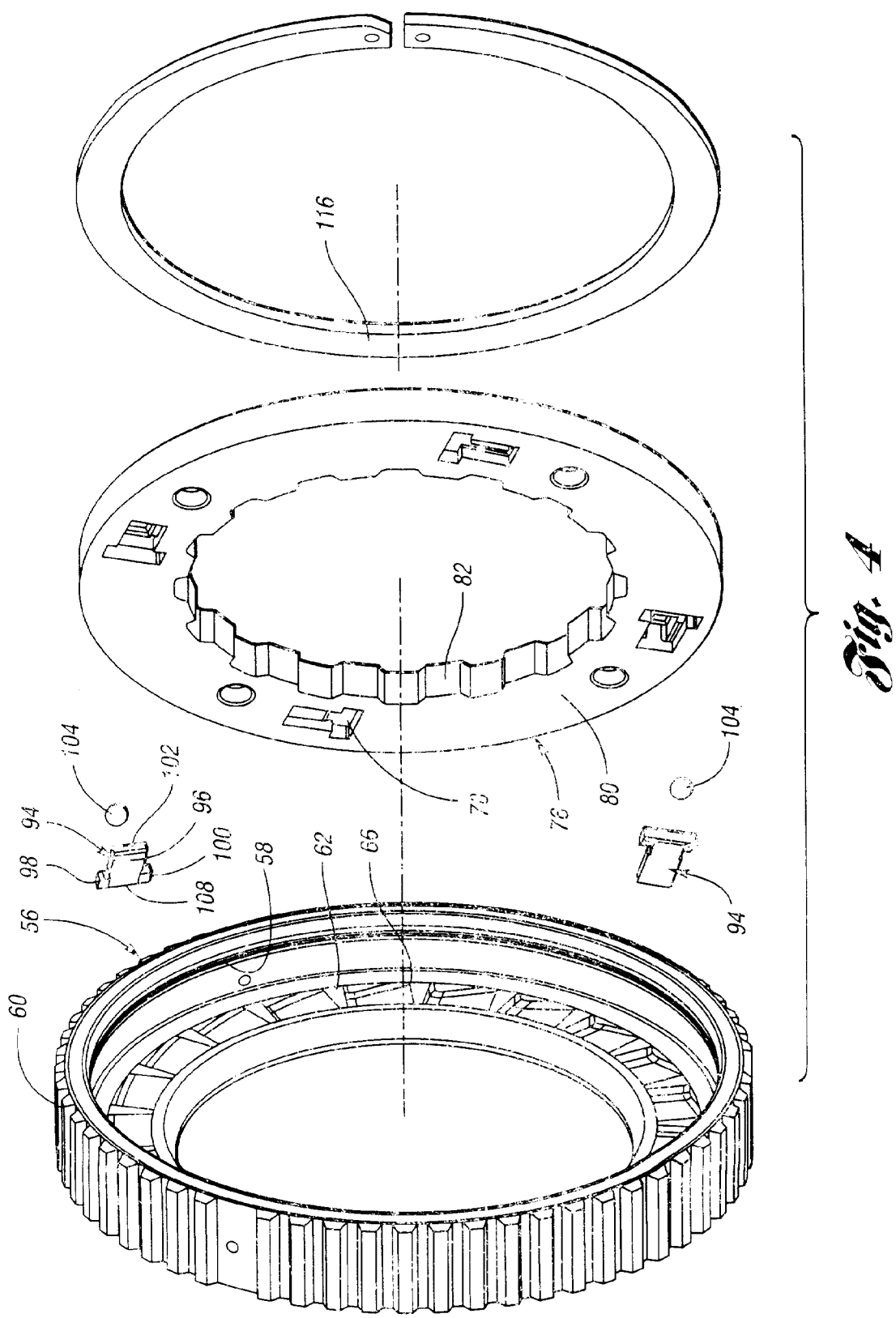

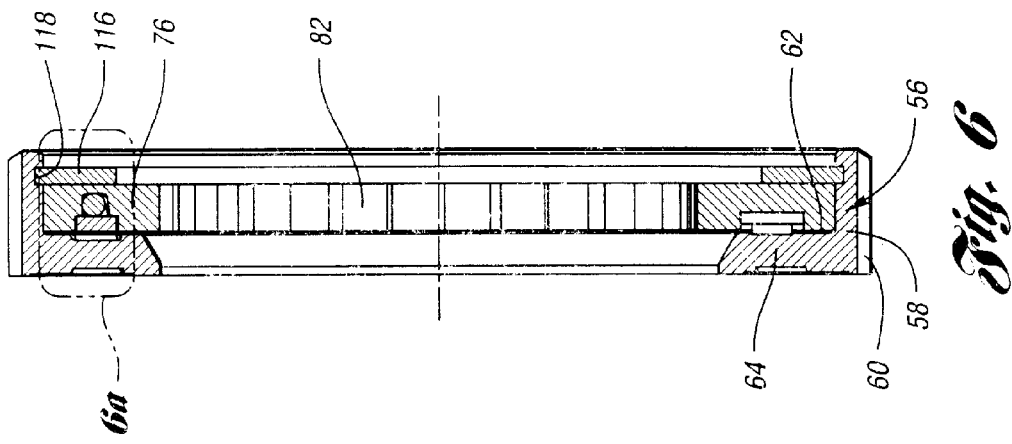
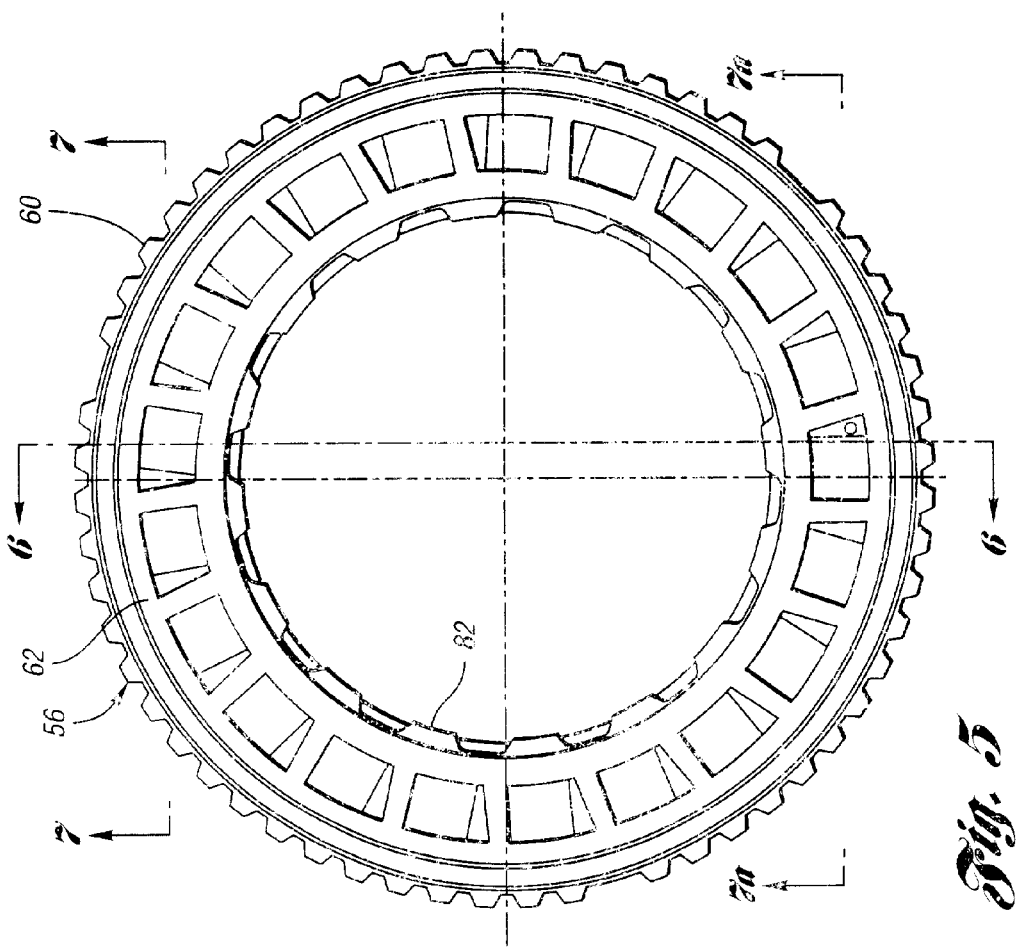

INERTIA-ACTUATED OVERRUNNING COUPLING ASSEMBLY

TECHNICAL FIELD

The invention relates to overrunning coupling assemblies having relatively movable coupling plates with juxtaposed planar surfaces.

BACKGROUND ART

It is known design practice in the management of torque in a power transmission mechanism to use overrunning couplings in combination with friction elements, such as friction brakes or friction clutches, as torque transfer paths are established and disestablished between a driving member and a driven member. An example of an overrunning coupling in an environment of this type may be seen by referring to U.S. Pat. No. 5,413,539 (referred to as the '539 patent), which discloses a multiple-ratio, geared, automatic transmission for automotive vehicle powertrains. The overrunning coupling disclosed in the '539 patent is a conventional roller clutch assembly that serves as a reaction torque transfer element when the gearing for the transmission is conditioned for intermediate speed ratio operation. It distributes reaction torque to the transmission casing when a forward-drive friction clutch is engaged.

It is known design practice also to substitute an overrunning planar clutch assembly for the roller clutch assembly of the design of the '539 patent so that the overall axial dimensions of the transmission gearing can be reduced to a minimum and the assembly procedure can be simplified. An overrunning planar clutch assembly of this kind is disclosed, for example, in U.S. Pat. No. 5,918,715, and U.S. Pat. No. 5,979,627 (referred to as the '715 patent and the '627 patent, respectively), both of which are assigned to the assignee of the present invention.

The planar clutch assemblies of the designs shown in the '715 and '627 patents include a pocket plate and a notch plate disposed in juxtaposed relationship, one with respect to the other, about a common rotary axis. Angularly spaced pockets or recesses are formed in a planar surface of a first plate, and notches are formed at angularly spaced locations in the planar surface of a companion second plate. Torque-transmitting struts are located in the pockets of the first plate so that they may pivot about an anchor point in each pocket. A spring is mounted in each pocket for the purpose of biasing the associated strut for pivotal movement about the anchor point so that one edge of the strut will engage a recess or notch formed in the planar surface of the second plate. This locks the plates together when relative torque transfer through the coupling assembly is in one direction while allowing freewheeling motion of one plate relative to the other when torque transfer is reversed.

DISCLOSURE OF INVENTION

It is an objective of the invention to provide a simplified, inertiaactuated overrunning coupling with planar coupling plates and with torque transmitting struts situated between the plates for torque transfer from one plate to the other in one direction but which will permit freewheeling motion of one plate relative to the other when torque is reversed. It is an objective also to eliminate the need for springs to urge the individual struts of the coupling assembly into engagement with the notch plate, thereby simplifying the overall assembly and simplifying the assembly process during manufacture of the coupling assembly.

An inertia ball is mounted in each pocket of the pocket plate. The pocket is formed with a ramp that is engaged by the inertia ball so that an inertia force component acts on the companion strut to urge the strut into engagement with the recesses or notches of the notch plate.

The inertia force component applied by the inertia ball on each of the struts eliminates the need for assembling individual springs for the struts, as in the case of the design of the '627 and '715 patents.

The improved coupling assembly of the invention eliminates ratcheting noise that typically is characteristic of a planar clutch in which the individual struts are spring-biased into engagement with a notch plate. It eliminates also a substantial degree of wear of the strut surfaces when the coupling is in an overrunning mode.

The cooperating parts of the clutch assembly may be made with alternate materials, unlike prior art designs where the mating parts typically are formed using powdered metal process steps. The use of alternate materials makes it possible to use alternative heat treatments for the struts because wear normally associated with ratcheting of the struts against the notch plate is not a design issue.

The pocket design of the pocket plate of the present invention allows the struts to rest on flat surfaces on the pocket plate during the overrunning mode. When the struts are activated by the inertia balls to a torque transfer mode, one edge of the struts will tip into a recess formed in the associated pockets whereby the opposite edges of the struts move to a position where they engage the recesses of the notch plate.

The inertia balls of the improved coupling assembly of the invention actuate the struts with a force that is determined by the rate of deceleration of the pocket plate. In the structural environment of an automatic transmission gearset, the pocket plate decelerates rapidly during a shift sequence. This rapid deceleration applies a constant force on the strut to effect engagement of the coupling assembly as the pocket plate angular velocity approaches zero and begins to reverse direction. Initial engagement of each strut with the notch plate face then will allow a margin of the struts to cam or wedge into full engagement with the notches of the notch plate, thereby achieving full reaction torque transmitting capacity at the instant a shift sequence in the transmission is commanded by the transmission control system.

In practicing the invention, a pocket plate and a notch plate are assembled in a torque flow path from a torque input member to a torque output member. The pocket plate and the notch plate have annular planar surfaces that are arranged on a common rotary axis in juxtaposed, close proximity, one with respect to the other. Angularly spaced pockets in the pocket plate and angularly spaced notches in the notch plate are located so that they are equidistant from a common geometric axis.

A primary ramped surface is formed in each pocket. A torque transmitting strut in each pocket has an anchor edge engaging the pocket plate and a movable edge engageable with the notch plate during operation of the coupling assembly in a locked mode.

Inertia members, or balls, are located in the pockets. These engage the ramped surfaces in the pockets so that inertia forces acting on the balls urge the struts into engagement with the notches in response to deceleration of the pocket plate.

Another feature of the invention comprises secondary ramped surfaces in the pockets, which are engaged by the balls as centrifugal forces on the balls are developed. The centrifugal forces develop a strut engaging centrifugal force component to initiate an instantaneous coupling assembly response to deceleration forces acting on the balls in the pocket plate. The faster the pocket plate rotates, the greater the ball force component becomes for any given secondary ramped surface angle.

The present invention is an overrunning coupling assembly comprising a pocket plate and a notch plate. One plate is connected to a torque input member and the other plate is connected to a torque output member. The pocket plate has a pocket plate planar surface and the notch plate has a notch plate planar surface. The planar surfaces are assembled on a common axis in juxtaposed close proximity. A plurality of angularly-spaced pockets are in the pocket plate planar surface, and a plurality of angularly-spaced notches are in the notch plate planar surface. A ramp surface portion is in each pocket. A torque-transmitting strut is in each pocket, each strut having an anchor edge engageable with the pocket plate and a movable edge engageable with the notch of the notch plate during operation of the overrunning coupling assembly in a locked mode. Inertia members are in the pockets between the struts and the ramp surface portion whereby inertia forces acting on the inertia members urge the struts into engagement with the notches in response to rotary inertia forces acting on the inertia members.

BRIEF DESCRIPTION OF DRAWINGS

FIG. 1 is a schematic diagram of an automatic transmission mechanism which includes the improved planar clutch assembly of the invention;

FIG. 2 is a chart showing a clutch and brake engagement-and-release pattern for accomplishing ratio changes in the gearing of the transmission shown in FIG. 1;

FIG. 4 is an exploded assembly view in which parts of the coupling assembly of the invention are shown in perspective view;

FIG. 5 is a cross-sectional view of the coupling assembly of FIG. 3, as seen from the plane of section line 5—5 of FIG. 3;

FIG. 6 is a cross-sectional view of the coupling assembly of the invention, as seen from a plane of section line 6—6 of FIG. 5;

BEST MODE FOR CARRYING OUT THE INVENTION

Figure 3:
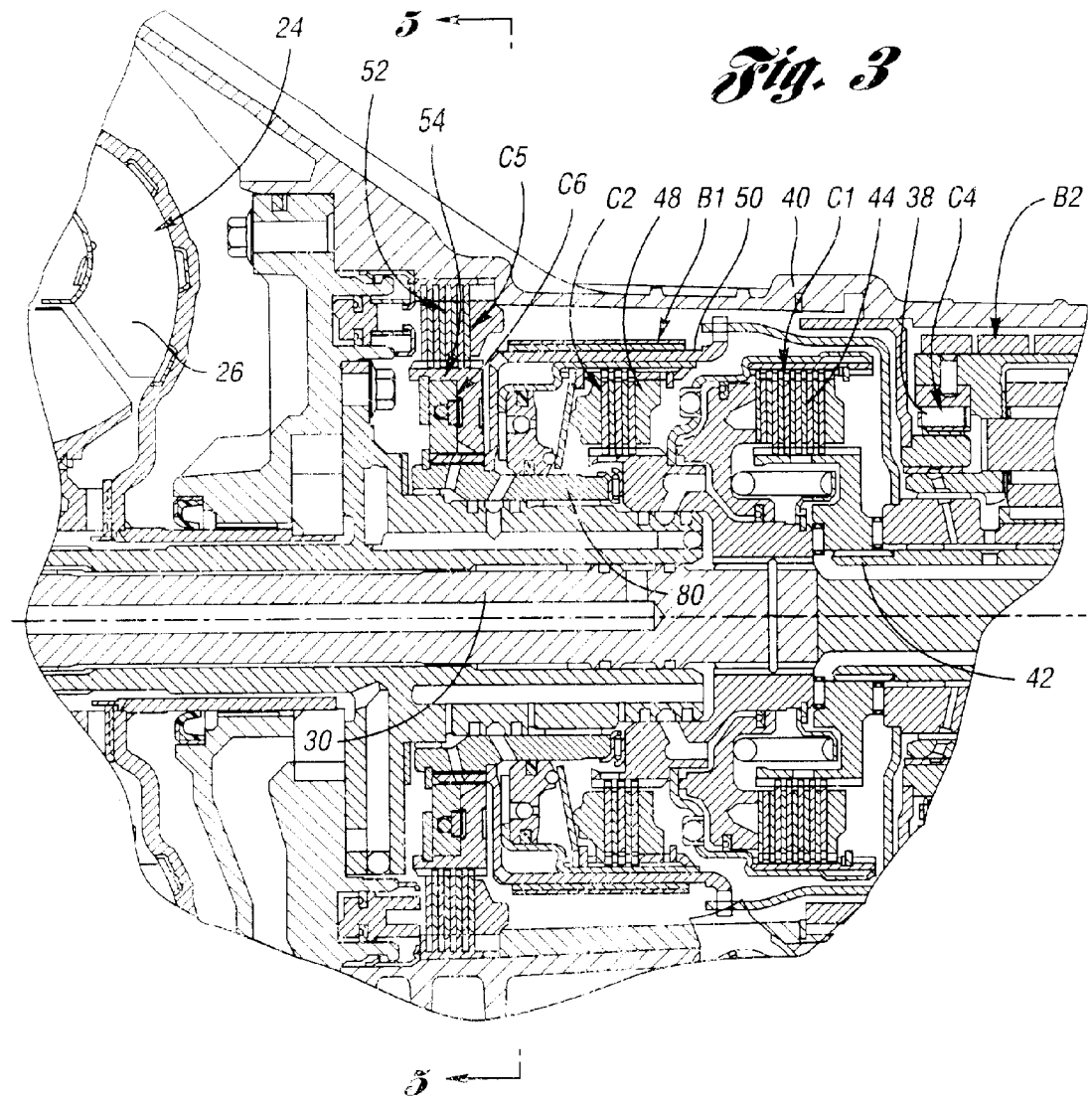
FIG. 3 is an enlargement of a cross-sectional view of a portion of the transmission assembly shown schematically in FIG. 1, particularly the overrunning coupling assembly of the invention (which is engaged during intermediate speed ratio operation)

FIG. 1 shows a compound planetary gear assembly of the so-called Ravagineaux type, which comprises a large diameter sun gear 12, a small diameter sun gear 14, and a common ring gear 16. A set of long planet pinions 18 drivably engage sun gear 12 and ring gear 16. A set of short planet pinions 20 drivably engages sun gear 14 and pinions 18. The pinions 18 and 20 are carried on a common carrier 22.

A hydrokinetic torque converter 24 includes an impeller 26 connected to an engine (not shown). A turbine 28 is connected to a turbine shaft 30, which in turn is connected to the common carrier 22 through direct drive clutch 32. The ring gear 16 is connected directly to power output shaft 34.

A low-and-reverse brake band 36 surrounds a brake drum connected to the common carrier 22 and anchors the common carrier 22 during reverse drive operation and during manual low ratio operation when coast braking is available. An overrunning coupling 38 provides a one-way torque flow path from the carrier 22 to the transmission housing shown at 40. The overrunning coupling 38 is in a reaction torque delivery mode during low speed ratio operation.

The turbine shaft 30 is connected to intermediate shaft 42 through forward clutch 44 (C1). Turbine shaft 30 is connected to large sun gear 12 through intermediate shaft 46 and reverse clutch 48 (C2).

During overdrive operation, large-diameter sun gear 12 acts as a reaction member. It is anchored by overdrive brake band 50 (B1) during fourth speed ratio operation. During intermediate speed ratio operation, sun gear 12 is anchored to the transmission housing through friction brake 52 (C5). The torque input side of the intermediate clutch 52 is connected to intermediate shaft 46 through an overrunning coupling 54 (C6).

FIG. 1 shows a schematic representation of one embodiment of the overrunning coupling 54 of the present invention. While this embodiment of the invention is shown as being used as a component of a planetary gear assembly, the invention may be used in any application where an overrunning coupling assembly is desired or useful, including without limitation any suitable clutch or transmission applications. This embodiment of the overrunning coupling 54 is shown in particular detail in FIG. 3., which will be described subsequently.

FIG. 2 is a chart showing the clutch and brake engagement-and-release pattern for the transmission schematically shown in FIG. 1. The "X" symbol in FIG. 2 represents an engaged clutch or brake. The symbol "OR" represents an overrunning state for an overrunning coupling. As indicated in FIG. 2, the overrunning coupling 54, which will be described with reference to FIG. 3, assumes an overrunning state in third speed ratio operation, but it is locked for reaction torque delivery to the transmission housing during second speed ratio operation. Thus, the coupling of the present invention, when the invention is adapted for the transmission of FIG. 1, will permit a non-synchronous upshift from the second speed ratio to the third speed ratio as clutch 32 is engaged. Clutch 44, which is the forward clutch, is engaged during operation in each of the first three forward driving ratios. Clutch 44 is released and brake 50 is applied to achieve fourth speed ratio operation, which is an overdrive.

It is apparent from FIGS. 1 and 2 that the reaction torque input side for the coupling 54 decelerates rapidly when a downshift occurs from the third ratio to the second ratio. Coupling 54 assumes a locked-up state after the downshift is complete. On an upshift from the second ratio to the third ratio, the coupling 54 freewheels as reaction torque flow to the transmission housing is terminated and the large sun gear 12 reverses direction.

As seen in FIGS. 4, 6, 7 and 7a, an embodiment of the overrunning coupling 54 may include a notch plate 56, which comprises an annular ring 58 on which is formed a series of external spline teeth 60. These spline teeth 60 register with internal spline teeth formed on friction disks of the friction coupling 52, seen in FIGS. 1 and 3.

The notch plate 56 has a notch plate planar surface, in this embodiment an annular planar surface, on a radially extending portion 64 of the ring 58. Notches 66 are formed in the face 62. The notches 66 are spaced uniformly about the axis of the notch plate.

Figure 7:
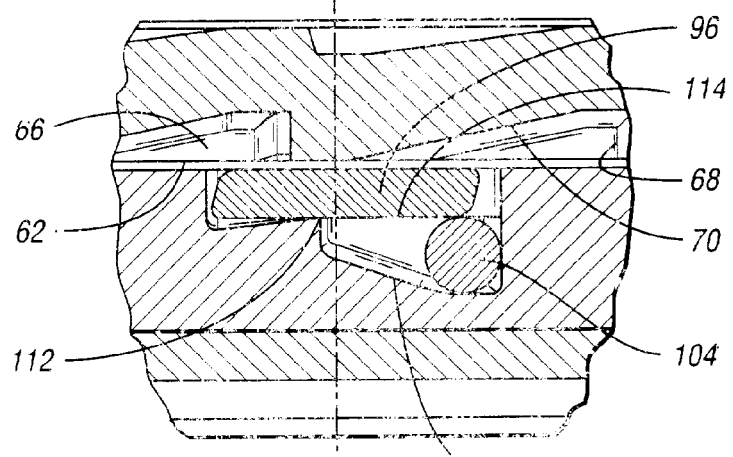
FIG. 7 is a cross-sectional view of the coupling assembly of FIG. 5, as seen from the plane of section line 7—7 of FIG. 5, showing the coupling assembly of the invention in an overrunning state.
Figure 7A:
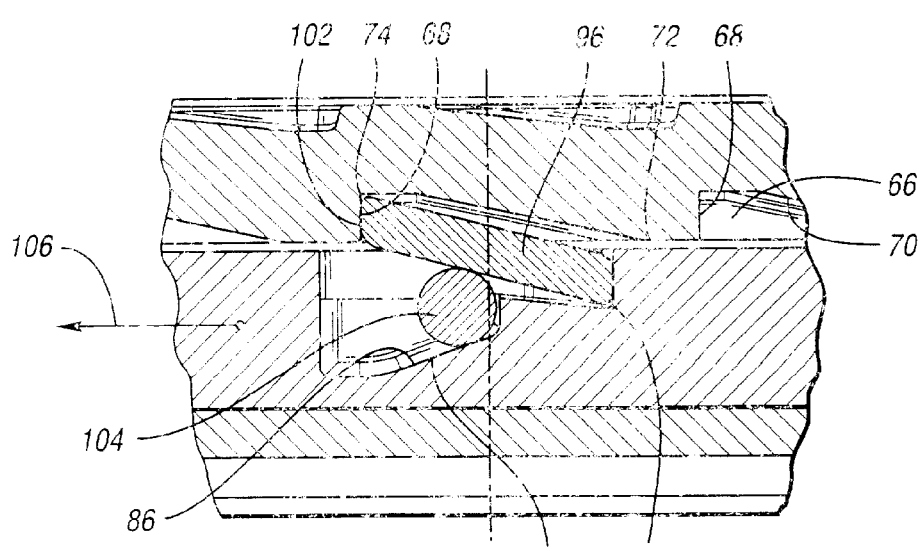
FIG. 7a is a cross-sectional view of the coupling assembly of FIG. 5, as seen from the plane of section line 7a—7a of FIG. 5, showing the elements of the coupling assembly in a locked condition.

As best seen in FIGS. 7 and 7a, the notches of the notch plate 56 have a strut-engaging abutment 68 and a ramped surface portion 70. The ramped surface portion extends from a first edge 72 in the planar surface 62 to a second edge 74 at the base of the abutment 68.

A pocket plate 76 of this embodiment of the invention is received within the ring 58 of the notch plate 56, as best seen in FIGS. 4 and 6. In this embodiment of the invention, the pocket plate 76 is provided with angularly spaced pockets 78 formed in a pocket plate planar surface 80. The inner periphery of the pocket plate is formed with internal spline teeth 82, seen in FIGS. 4–6. These teeth engage external spline teeth formed on the sleeve 84, which forms a part of the clutch assembly 48, as seen in FIG. 3.

Figure 4A:
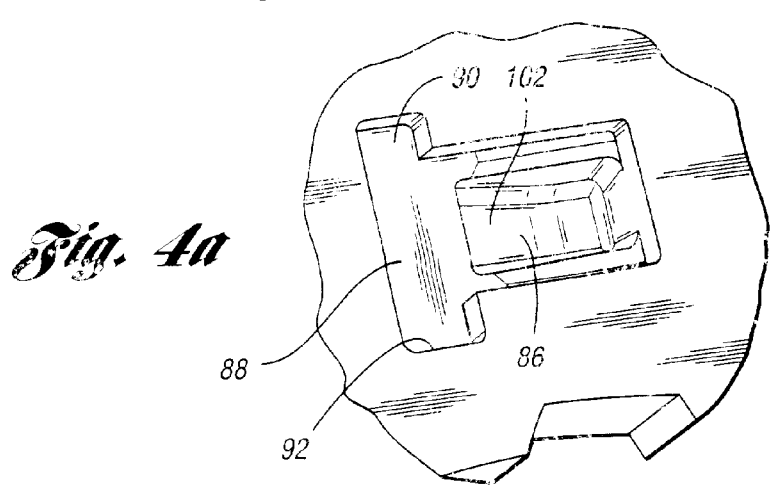
FIG. 4a is a perspective view showing the details of a pocket formed in the pocket plate of the coupling assembly of the invention.

FIG. 4a shows an enlargement of the pocket 78. In this embodiment of the invention, the pocket 78 has a recess 86, which has a depth greater than the depth of portion 88 of the pocket. The pocket portion 88 has a radial dimension that is greater than the radial dimension of the recess 86, thereby defining a pair of pocket extensions 90 and 92.

Each pocket 78 receives a strut 94, seen in FIG. 4. In this embodiment of the invention, each strut 94 has a body portion 96 and a pair of strut extensions 98 and 100. Each strut has a movable edge 102 and a pivot or anchor edge 108. The movable edge 102 is engageable with the abutment 68 of the notch plate. When the strut is moved toward the notch plate, the strut extensions 98 and 100 are received in the pocket extensions 90 and 92, seen in FIG. 4a.

Figure 6A:
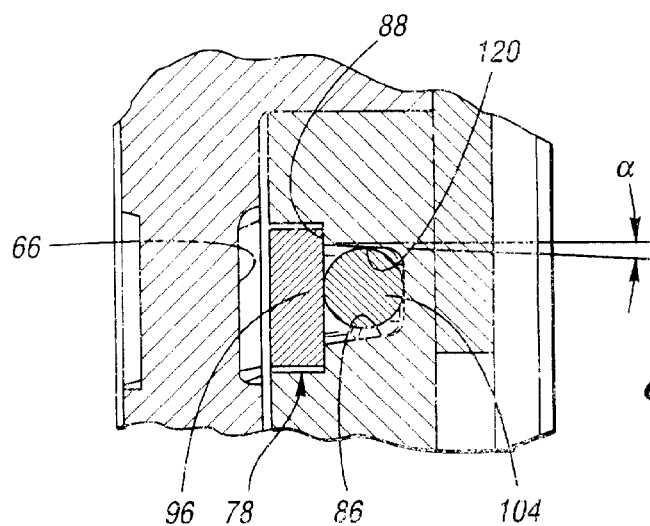
FIG. 6a is an enlargement of the portion of the coupling assembly shown in the reference circle in FIG. 6.

As best seen in FIG. 6a, each recess 86 receives an actuator inertia member with a rounded roll surface, such as a ball 104, which is engageable with an adjacent strut 96. The actuator ball 104, when it is subjected to deceleration forces (e.g., during a third ratio to second ratio shift of the transmission shown in FIGS. 1 and 3), will move up a ramped surface of the pocket 78, thereby urging the strut 94 into registry with an adjacent notch of the notch plate. In the case of a shift from a coasting state in second ratio to a driving state in second ratio, for example, the force vector 106 in FIG. 7a would be a negative angular deceleration force (i.e., an angular acceleration force) for the transmission of FIGS. 1 and 3. This is apparent from the chart of FIG. 2 and the schematic diagram of FIG. 1. Both angular deceleration forces and angular acceleration forces are rotary inertia forces. The planar clutch assembly thus assumes a locked condition. This is the condition indicated in FIG. 7a. The direction of a deceleration force is shown by the vector 106 in FIG. 7a. The strut, when it is activated by the actuator ball 104 seen in FIG. 7a, will pivot about its pivot edge 108 as the ball 104 moves up the ramp portion of the recess 86.

In this embodiment of the invention, the movable edge 102 of the strut 96 is formed with an angle, best seen in FIG. 7a, which will cause the strut 96 to move into full engagement with the abutment 68 of the notch plate. When the ball 104 moves by reason of the inertia forces (i.e., angular acceleration or deceleration forces) and causes initial engagement of the strut 96 with the abutment 68, the angle on the movable edge 110 of the strut will cause the strut to assume the fully engaged position shown in FIG. 7a.

When the overrunning coupling assembly assumes an overrunning condition, as seen in FIG. 7, the ball 104 will move down the primary ramp surface 103 of the pocket 86, thereby allowing the strut 96 to pivot about pivot edge 1 12 in the pocket. At that time, the strut 96 will engage a flat surface 114 in the pocket, thereby permitting the struts to be fully disengaged from the notch plate. The struts will rest on the flat surface 114 during the overrunning mode, which avoids interference of the struts with the notch plate thus preventing wear of the notch plate and the adjacent surfaces of the struts.

As seen in FIGS. 4 and 6, the overrunning coupling includes an end plate 116, which functions as a snap ring for maintaining the pocket plate 76 assembled within the ring 58 of the notch plate. The plate 116 is received in a peripheral groove 118 in the notch plate. The plate 116, together with the notch plate 56, form an annular channel that may receive lubricating oil from the transmission lubrication system, thereby maintaining a film of oil between the engaging surfaces of the struts 94 and the pocket plate 76.

As best seen in FIG. 6a, this embodiment of the invention includes a secondary ramped portion. In this particular embodiment of the invention, the secondary ramped portion is the outer side surface 120 of the recess 86 which receives the balls 104. In this embodiment of the invention, the outer side surface 120 is formed at angle α relative to the direction of the geometric axis of the coupling assembly. When the pocket plate 76 rotates during the overrunning condition, the ball 104 engages the secondary ramped portion (in this embodiment, the outer side surface 120 of the recess 86), which causes the ball to engage the strut 96 and create a threshold centrifugal force component on the strut whereby the strut is preconditioned for engagement with the pocket place 76 the instant a rotary inertia force is created at the outset of a ratio change. This angle α makes it possible for the coupling assembly to achieve an instantaneous response to a rotary inertia force on the pocket plate. The magnitude of the centrifugal force is a function of the rotary speed of the pocket plate.

Although a preferred embodiment of the invention has been described, it will apparent to persons skilled in the art that modifications may be made without departing from the scope of the invention. All such modifications and all equivalents are intended to be covered by the following claims.

What is claimed is:

1. An overrunning coupling assembly comprising:

a pocket plate and a notch plate, one plate being connected to a torque input member and the other plate being connected to a torque output member;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a ramped surface in each pocket;

a torque-transmitting strut in each pocket, each strut having an anchor edge engageable with the pocket plate and a movable edge engageable with a notch in the notch plate during operation of the overrunning coupling assembly in a locked mode; and inertia members having rounded roll surfaces in the pockets between the struts and the ramped surfaces whereby the inertia members urge the struts into engagement with notches in the notch plate in response to rotary inertia forces acting on the inertia members.

2. An overrunning coupling assembly comprising a pocket plate and a notch plate one plate being connected to a torque input member and the other plate being connected to a torque output member;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a ramped surface portion in each pocket;

a torque-transmitting strut in each pocket, each strut having an anchor edge engageable with the pocket plate and a movable edge engageable with a notch in the notch plate during operation of the overrunning coupling assembly in a locked mode; and inertia members having rounded roll surfaces in the pockets between the struts and the ramped surface portion whereby the inertia members urge the struts into engagement with notches in the notch plate in response to rotary inertia forces acting on the inertia members;

each pocket in the pocket plate including a secondary ramped surface located at a radially outward wall of the surfaces whereby centrifugal forces acting on the inertia members, upon rotary motion of the pocket plate, effect movement of the inertia members to establish strut actuating forces in an axial direction.

3. The overrunning coupling assembly set forth in claim 2 wherein each pocket has at least one pocket extension in a generally radial direction, each strut having at least one strut extension in a generally radial direction received in the at least one pocket extension.

4. The overrunning coupling assembly set forth in claim 3 wherein each pocket has a flat surface, the struts being positioned in engagement with the flat surfaces when the overrunning coupling is in an overrunning mode.

5. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:

a pocket plate and a notch plate, one plate being connected to the reaction gear element and the other plate being connected to a stationary portion of the transmission through the friction coupling;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notch in the notch plate planar surface;

a ramped surface portion in each pocket;

a torque-transmitting strut in each pocket, each strut having an anchor edge engageable with the pocket plate and a movable edge engageable with a notch in the notch plate; and inertia members having rounded roll surfaces in the pockets between the struts and the ramped surface portion whereby the inertia members urge the struts into engagement with notches in the notch plate in response to rotary inertia forces acting on the inertia members.

6. The overrunning coupling assembly set forth in claim 5 wherein each pocket has at least one pocket extension, each strut having at least one strut extension received in the at least one pocket extension.

7. The overrunning coupling assembly set forth in claim 6 wherein each pocket has a flat surface, the struts being positioned in engagement with the flat surfaces when the overrunning coupling is in an overrunning mode.

8. The overrunning coupling assembly as set forth in claim 5 wherein each pocket in the pocket plate includes a secondary ramped portion located at a radially outward wall of the pocket, the inertia members engaging the secondary ramped portion whereby centrifugal forces acting on the inertia members, upon rotary motion of the pocket plate, effect movement of the inertia members to establish strut actuating forces in an axial direction.

9. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:

a pocket plate and a notch plate, one plate being connected to the reaction gear element and the other plate being connected to a stationary portion of the transmission through the friction coupling;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a primary ramped surface portion in each pocket;

a torque-transmitting strut in each pocket, each strut having an anchor edge engageable with the pocket plate and a movable edge engageable with a notch in the notch plate; and inertia members in the pockets between the struts and the primary ramped surface portion whereby inertia forces acting on the inertia members urge the struts into engagement with the notches in response to angular deceleration forces acting on the inertia members; and each pocket in the pocket plate including a secondary ramped portion located at a radially outward wall of the pocket, the inertia members engaging the secondary ramped portion whereby centrifugal forces acting on the inertia members, upon rotary motion of the pocket plate, effect movement of the inertia members so as to establish strut actuating forces in an axial direction.

10. The overrunning coupling assembly set forth in claim 9 wherein each pocket has at least one pocket extension, each strut having at least one strut extension received in the at least one pocket extension.

11. The overrunning coupling assembly set forth in claim 10 wherein each pocket has a flat surface, the struts being positioned in engagement with the flat surfaces when the overrunning coupling is in an overrunning mode.

12. The overrunning coupling assembly set forth in claim 9 wherein each pocket has a flat surface, the struts being positioned in engagement with the flat surface when the overrunning coupling is in an overrunning mode.

13. An overrunning coupling assembly comprising
   a pocket plate and a notch plate, one plate being connected to a torque input member and the other plate being connected to a torque output member;
   the pocket plate having a pocket plate planar surface and the notch plate having a notch plate planar surface, the planar surfaces being assembled on a common axis in juxtaposed close proximity;
   a plurality of angularly-spaced pockets in the pocket plate planar surface;
   a plurality of angularly-spaced notches in the notch plate planar surface;
   a ramped surface portion in each pocket;
   a torque-transmitting strut in each pocket, each strut having an anchor edge engageable with the pocket plate and a movable edge engageable with a notch in the notch plate during operation of the overrunning coupling assembly in a locked mode; and
   inertia members having rounded roll surfaces in the pockets between the struts and the ramped surface portion whereby the inertia members urge the struts into engagement with notches in the notch plate in response to rotary inertia forces acting on the inertia members;
   each pocket in the pocket plate including a secondary ramped portion located at a radially outward wall of the pocket, the inertia members engaging the secondary ramped portion whereby centrifugal forces acting on the inertia members, upon rotary motion of the pocket plate, effect movement of the inertia members so as to establish strut actuating forces in an axial direction.

14. An overrunning coupling assembly comprising:
   a pocket plate and a notch plate, one plate being connected to a torque input member and the other plate being connected to a torque output member;
   the pocket plate having a pocket plate planar surface and the notch plate having a notch plate planar surface, the planar surfaces being assembled on a common axis in juxtaposed close proximity;
   a plurality of angularly-spaced pockets in the pocket plate planar surface;
   a Plurality of angularly-spaced notches in the notch plate planar surface;
   a ramped surface in each pocket;
   a torque-transmitting strut in each pocket, each strut having an anchor edge engageable with the pocket plate and a movable edge engageable with a notch in the notch plate during operation of the overrunning coupling assembly in a locked mode; and
   inertia balls in the pockets between the struts and the ramped surfaces whereby the inertia balls urge the struts into engagement with notches in the notch plate in response to rotary inertia forces acting on the inertia balls.

15. An overrunning coupling assembly comprising
   a pocket plate and a notch plate, one plate being connected to a torque input member and the other plate being connected to a torque output member;
   the pocket plate having a pocket plate planar surface and the notch plate having a notch plate planar surface, the planar surfaces being assembled on a common axis in juxtaposed close proximity;
   a plurality of angularly-spaced pockets in the pocket plate planar surface;
   a plurality of angularly-spaced notches in the notch plate planar surface;
   a ramped surface portion in each pocket;
   a torque-transmitting strut in each pocket, each strut having an anchor edge engageable with the pocket plate and a movable edge engageable with a notch in the notch plate during operation of the overrunning coupling assembly in a locked mode; and
   inertia balls in the pockets between the struts and the primary ramped surface portion whereby the inertia balls urge the struts into engagement with notches in the notch plate in response to rotary inertia forces acting on the inertia balls;
   each pocket plate including a secondary ramped surface located at a radially outward wall of the pocket, the inertia balls engaging the secondary ramped surfaces whereby centrifugal forces acting on the inertia balls, upon rotary motion of the pocket plate, effect movement of the inertia balls to establish strut actuating forces in an axial direction.

16. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:
   a pocket plate and a notch plate, one plate being connected to the reaction gear element and the other plate being connected to a stationary portion of the transmission through the friction coupling;
   the pocket plate having a pocket plate planar surface and the notch plate having a notch plate planar surface, the planar surfaces being assembled on a common axis in juxtaposed close proximity;
   a plurality of angularly-spaced pockets in the pocket plate planar surface;
   a plurality of angularly-spaced notches in the notch plate planar surface;
   a ramped surface portion in each pocket;
   a torque-transmitting strut in each pocket, each strut having an anchor edge engageable with the pocket plate and a movable edge engageable with a notch in the notch plate; and
   inertia balls in the pockets between the struts and the ramped surface portion whereby the inertia balls urge the struts into engagement with notches in the notch plate in response to rotary inertia forces acting on the inertia balls.

17. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:

a pocket plate and a notch plate, one plate being connected to the reaction gear element and the other plate being connected to a stationary portion of the transmission through the friction coupling;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a primary ramped surface portion in each pocket;

a torque-transmitting strut in each pocket, each strut having an anchor edge engageable with the pocket plate and a movable edge engageable with a notch in the notch plate; and inertia balls in the pockets between the struts and the primary ramped surface portion whereby inertia forces acting on the inertia balls urge the struts into engagement with the notches in response to angular deceleration forces acting on the inertia balls; and each pocket in the pocket plate including a secondary ramped portion located at a radially outward wall of the pocket, the inertia balls engaging the secondary ramped portion whereby centrifugal forces acting on the inertia balls, upon rotary motion of the pocket plate, effect movement of the inertia balls so as to establish strut actuating forces in an axial direction.

18. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:

a pocket plate and a notch plate, one plate being connected to the reaction gear element and the other plate being connected to a stationary portion of the transmission through the friction coupling;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a primary ramped surface portion in each pocket;

a torque-transmitting strut in each pocket, each strut having an anchor edge engageable with the pocket plate and a movable edge engageable with a notch in the notch plate; and inertia balls in the pockets between the struts and the primary ramped surface portion whereby inertia forces acting on the inertia balls urge the struts into engagement with the notches in response to angular deceleration forces acting on the inertia balls; and each pocket in the pocket plate including a secondary ramped portion located at a radially outward wall of the pocket, the inertia balls engaging the secondary ramped portion whereby centrifugal forces acting on the inertia balls, upon rotary motion of the pocket plate, effect movement of the inertia balls so as to establish strut actuating forces in an axial direction;

each pocket being formed with radially spaced enlarged portions, each strut having radially spaced extensions received in the radially spaced enlarged portions whereby the struts are retained within their respective pockets;

a flat surface formed in each pocket, the flat surface being parallel to and spaced from the first annular planar surface, the struts being positioned in engagement with the flat surfaces when the overrunning coupling is in an overrunning mode as the movable edges of the struts are disengaged from the notch plate.

19. An overrunning coupling assembly comprising a pocket plate and a notch plate, one plate being connected to a torque input member and the other plate being connected to a torque output member;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a primary ramped surface portion in each pocket;

a torque-transmitting strut in each pocket, each strut having an anchor edge engageable with the pocket plate and a movable edge engageable with a notch in the notch plate during operation of the overrunning coupling assembly in a locked mode; and inertia balls in the pockets between the struts and the primary ramped surface portion whereby inertia forces acting on the inertia balls urge the struts into engagement with the notches in response to angular acceleration forces acting on the inertia balls;

wherein each pocket has at least one pocket extension, each strut having at least one strut extension received in the at least one pocket extension.

20. An overrunning coupling assembly for a power transmission mechanism having multiple torque ratio gearing, the transmission comprising clutch and brake means for establishing and disestablishing plural torque flow paths through the gearing including a reaction gear element for establishing a torque reaction point during operation of the gearing in a first ratio and a selectable engageable friction coupling forming a reaction torque flow path for the reaction gear element, the overrunning coupling assembly comprising:

a pocket plate and a notch plate, one plate being connected to the reaction gear element and the other plate being connected to a stationary portion of the transmission through the friction coupling;

the pocket plate having a pocket plate planar surface and the notch plate having a notch plate planar surface, the planar surfaces being assembled on a common axis in juxtaposed close proximity;

a plurality of angularly-spaced pockets in the pocket plate planar surface;

a plurality of angularly-spaced notches in the notch plate planar surface;

a ramped surface portion in each pocket;

a torque-transmitting strut in each pocket, each strut having an anchor edge engageable with the pocket plate and a movable edge engageable with a notch in the notch plate; and inertia balls in the pockets between the struts and the ramped surface portion whereby inertia forces acting on the inertia balls urge the struts into engagement with the notches in response to angular acceleration forces acting on the inertia balls;

wherein each pocket has at least one pocket extension, each strut having at least one strut extension received in the at least one pocket extension.

* * * * *

UNITED STATES PATENT AND TRADEMARK OFFICE
CERTIFICATE OF CORRECTION

PATENT NO. : 6,481,551 B1
DATED : November 19, 2002
INVENTOR(S) : Ruth

It is certified that error appears in the above-identified patent and that said Letters Patent is hereby corrected as shown below:

Column 8,
Line 1, "notch" should be -- notches --.

Column 9,
Line 57, "Plurality" should be -- plurality --.

Signed and Sealed this

Twenty-second Day of April, 2003

JAMES E. ROGAN
*Director of the United States Patent and Trademark Office*